(12) United States Patent
Jun

(10) Patent No.: US 6,661,412 B1
(45) Date of Patent: Dec. 9, 2003

(54) DEVICE FOR TESTING DIGITAL MONITOR

(75) Inventor: Il Jin Jun, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 09/679,636

(22) Filed: Oct. 5, 2000

(30) Foreign Application Priority Data

Oct. 6, 1999 (KR) ......................................... 1999-43061

(51) Int. Cl.$^7$ ................................................ G09G 5/00
(52) U.S. Cl. ...................................... 345/204; 345/698
(58) Field of Search ................................ 345/204, 698, 345/699, 213

(56) References Cited

U.S. PATENT DOCUMENTS

| | | | | |
|---|---|---|---|---|
| 5,345,263 A | * | 9/1994 | Miller | 348/182 |
| 5,767,916 A | * | 6/1998 | West | 348/537 |
| 5,841,430 A | * | 11/1998 | Kurikko | 345/213 |
| 6,295,048 B1 | * | 9/2001 | Ward et al. | 345/785 |
| 6,323,828 B1 | * | 11/2001 | Perez | 345/10 |

* cited by examiner

Primary Examiner—Bipin Shalwala
Assistant Examiner—Jimmy H. Nguyen
(74) Attorney, Agent, or Firm—Fleshner & Kim, LLP

(57) ABSTRACT

A device for testing a digital monitor which enables to test for each kind of operation in a digital monitor is disclosed. It includes a Field Programmable Gate Array (FPGA) for outputting a timing control signal, an oscillation section for generating a reference clock pulse for the FPGA, and an input selection section for selecting a resolution or a color pattern of an input image of a monitor. It can also include a microcomputer to control the FPGA, so as to output a timing control signal according to the resolution selected in the input selection section, and output color control data for controlling the input image of the monitor to correspond to the color pattern selected in the input selection section. Next, it includes a transmitter for transmitting digital R/G/B image signals and clock pulses to the monitor according to the timing control signal outputted from the FPGA and the color control data outputted from the microcomputer. A power supply section can also be included for providing operational power to the FPGA, the oscillation section, the microcomputer, and the transmitter. Accordingly, working efficiency can be improved since the test process is simplified and refined.

10 Claims, 4 Drawing Sheets

DEVICE FOR TESTING DIGITAL MONITOR

BACKGROUND OF THE INVENTION

1. Field of the Invention

The present invention relates to a digital monitor, and more particularly to a device for testing a digital monitor.

2. Background of the Related Art

Generally, a monitor is a device for displaying image signals of an image mode such as SVGA (800×600), XGA (1024×768), or SXGA (1280×1024), for example, on a screen. The image signals typically have been transmitted from a video card of a main body, for example, a personal computer (PC) or a work station, which is linked to the monitor through a prescribed signal process. The monitor may be a flat display element, which is suitable for large monitors to meet the current trend for large display devices. Such large monitors have taken advantage of the development of modern techniques which were started with monitors using cathode ray tubes (CRT). Recently, however, digital monitors using liquid crystal displays (LCD) have been commercialized. Video cards have been changing from existing analog devices to digital devices to meet the monitor digitalization.

A related art test process of a digital monitor is performed by emulating the condition where an actual digital video card is linked to each manufactured digital monitor, so as to provide a digital image format, since the related art monitor test device could not support the digital image format matching to the digital monitor.

The related art test device has many problems. For example, the total test process has become more complicated and error prone, since each monitor has to link with the corresponding digital video card. Each different monitor model may also require a different digital vide card. Thus, testing the monitors requires extensive work, and is time consuming.

The above references are incorporated by reference herein where appropriate for appropriate teachings of additional or alternative details, features and/or technical background.

SUMMARY OF THE INVENTION

An object of the present invention is to solve at least the above problems and/or disadvantages and to provide at least the advantages described hereinafter.

Another object of the present invention is to provide a device for testing a digital monitor that substantially obviates the problems caused by disadvantages of the related art.

Another object of the present invention is to provide a device for testing a digital monitor that improves the working efficiency by performing a test operation of a digital monitor which is easy and correct.

To achieve these and other advantages, in whole or in parts, there is provided a device for testing a digital monitor, including a Field Programmable Gate Array (FPGA) for outputting a timing control signal; an oscillation section for generating a reference clock pulse and providing to the FPGA; an input selection section for selecting a resolution or a color pattern of an input image of a monitor; a microcomputer for controlling the FPGA to be outputted a timing control signal according to the resolution selected in the input selection section, and outputting a color control data for controlling the input image of the monitor to correspond to the color pattern selected in the input selection section; a transmitter for transmitting to the monitor digital R/G/B image signals and clock pulses according to the timing control signal outputted from the FPGA and the color control data outputted from the microcomputer; and a power supply section for providing an operational power to the FPGA, the oscillation section, the microcomputer, and the transmitter, respectively.

To further achieve these and other advantages, there is provided a device for testing a digital monitor including, an input selection section for selecting a resolution or a color pattern of an input image of a monitor; a Field Programmable Gate Array (FPGA) for outputting a timing control signal according to the resolution selected in the input selection section, and outputting a color control data for controlling the color pattern of the input image of the monitor according to the color pattern selected in the input selection section; an oscillation section for generating a reference clock pulse and providing the FPGA; a transmitter for transmitting to the monitor digital R/G/B image signals and clock pulses according to the timing control signal and the color control data outputted from the FPGA; and a power supply section for providing an operational power to the FPGA, the oscillation section, and the transmitter, respectively.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
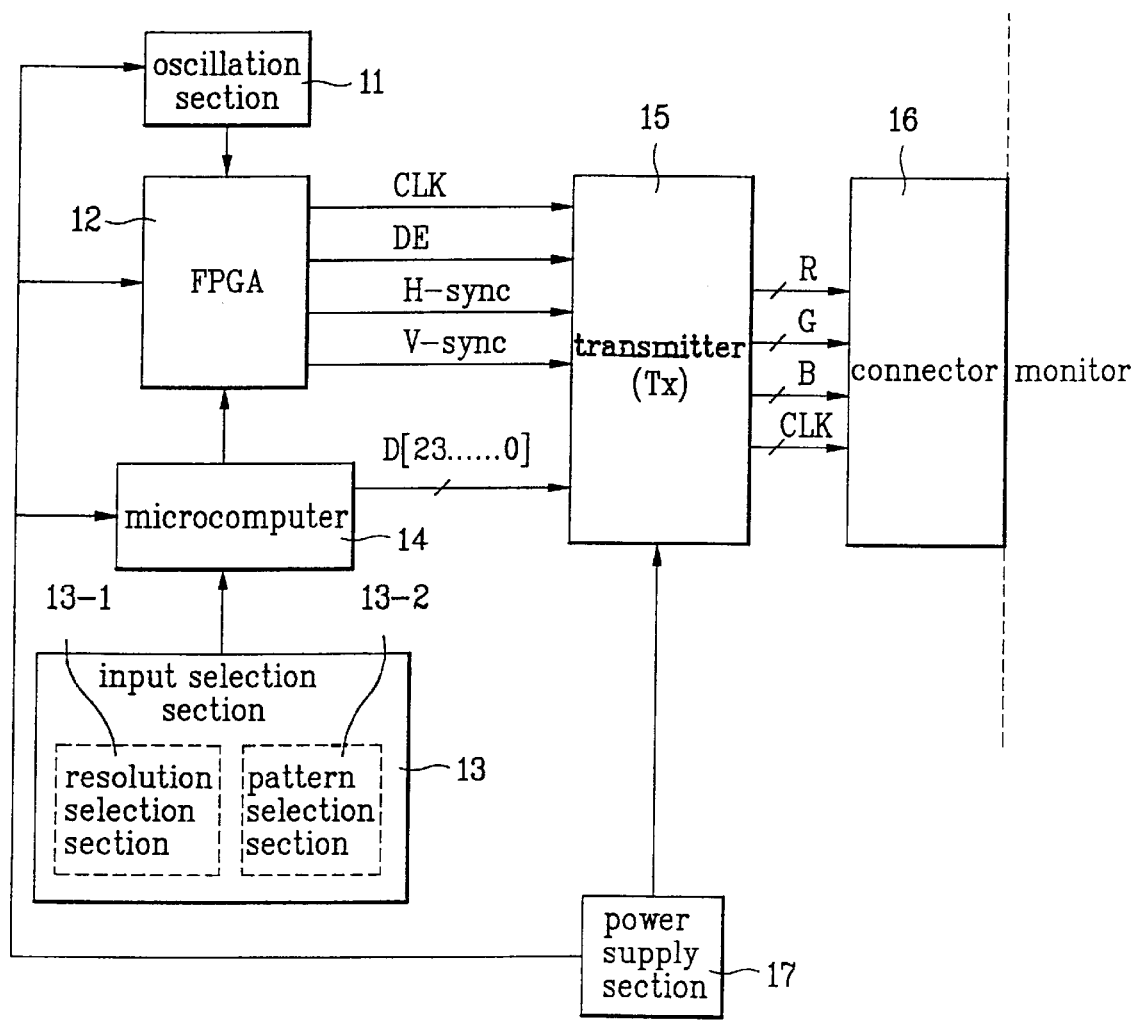
FIG. 1 is a block diagram of a digital monitor test device according to a first preferred embodiment of the present invention.

FIG. 1 is a block diagram of the digital monitor test device according to a first preferred embodiment of the present invention. Referring to FIG. 1, the device includes an oscillation section 11 for generating a reference clock pulse, and a Field Programmable Gate Array (FPGA) 12 for outputting a timing control signal (for example, horizontal/vertical synchronization signal, a data enable signal, and a clock pulse). The timing control signal is outputted according to the reference clock pulse generated from the oscillation section 11 and a control signal from a microcomputer 14. The device further includes an input selection section 13 for selecting a resolution or a color pattern as an input image for testing the monitor, and the microcomputer 14, for supplying a control signal to the FPGA according to the resolution selected in the input selection section 13 and outputting color control data for controlling the input image of the monitor according to the color pattern selected in the input selection section 13. Next, a transmitter 15 is provided for transmitting digital R/G/B image signals and clock pulses to the monitor according to the timing control signal outputted from the FPGA 12 and the color control data outputted from the microcomputer 14. The system also preferably includes a power supply section 17 for providing operational power to the FPGA 12, the oscillation section 11, the microcomputer 14, and the transmitter 15, respectively.

Figure 2:
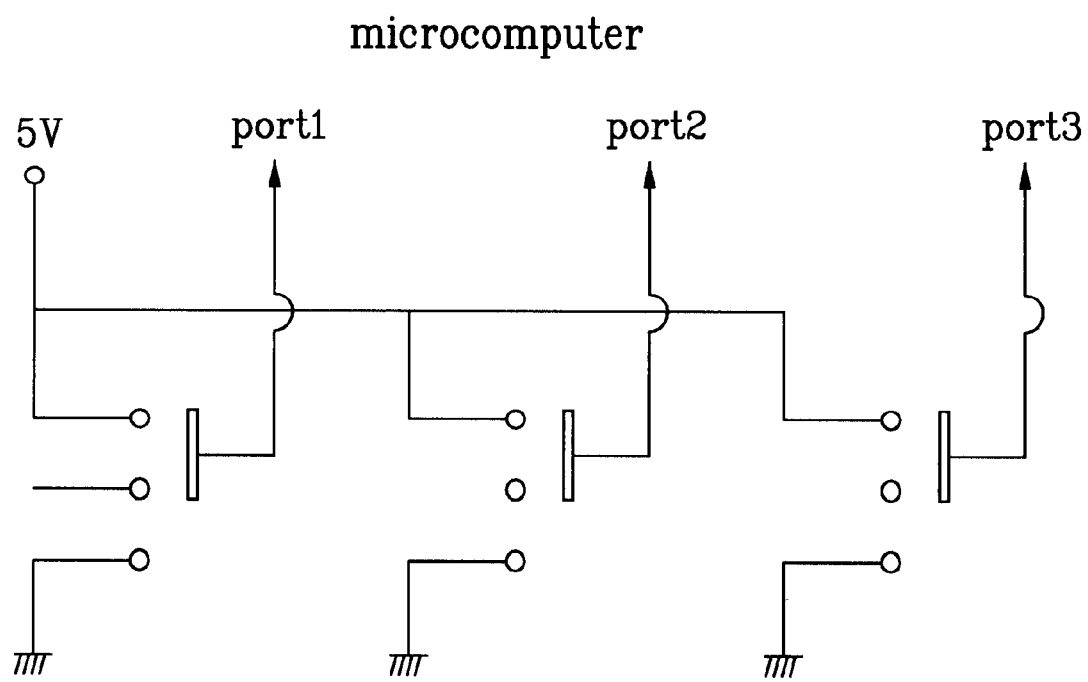
FIG. 2 is a circuit diagram of an input selection section shown in FIG. 1.

The input selection section 13 includes a resolution selection section 13-1 for selecting the resolution, and a pattern selection section 13-2, for selecting the color pattern of the input image for testing. A Dip switch is also included, which can be used as the resolution selection section 13-1 and the pattern selection section 13-2 as shown FIG. 2.

The operation of the first preferred embodiment of the digital monitor test device according to the present invention will next be described. First, a resolution or the color pattern for the test is selected through the input selection section 13. This can either be done manually or by an automatic test system. When the resolution or the color pattern for the test is selected through the input selection section 13, the microcomputer 14 perceives a state selected by the input selection section 13 and outputs the control signal to the FPGA 12. The output control signal is processed by the FPGA 12 and outputted as the timing control signal, for example, the horizontal/vertical synchronization signal, the data enable signal DE), and the clock pulse, according to the corresponding resolution. Next, the FPGA 12 generates the horizontal/vertical synchronization signal, the data enable signal DE), and the clock pulse of a specific resolution according to the control of the microcomputer 14 using the reference clock pulse provided from the oscillation section 11. These signals are then provided to the transmitter 15.

The microcomputer 14 also outputs digital color control data, comprising 24 bits D23~D0. The digital color control data has 8 bits for each R/G/B image signal. The digital color control data is outputted in accordance with the input selection section 13 so that the selected color pattern is provided to the monitor.

Figure 3:
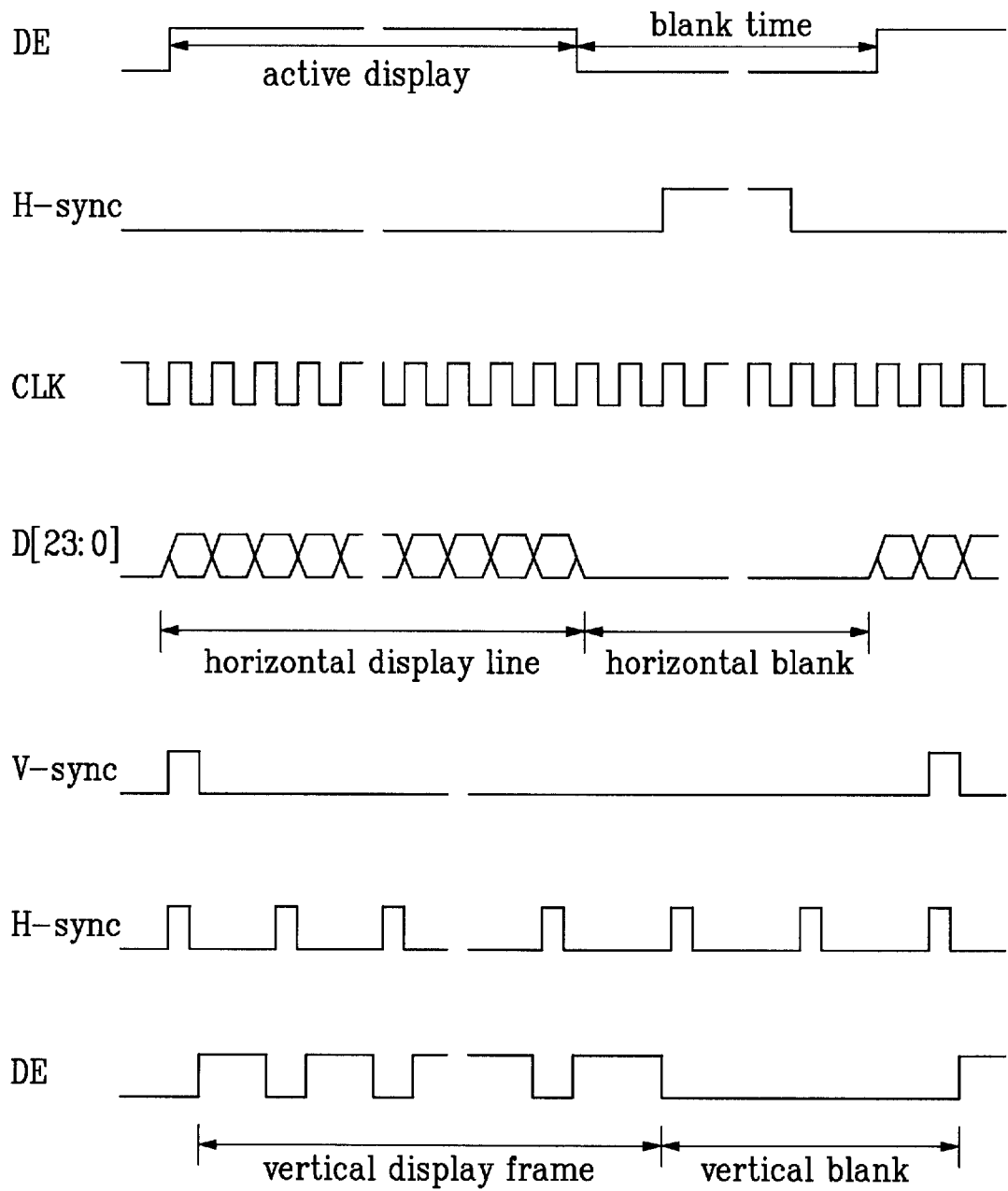
FIG. 3 is a waveform diagram inputting to a transmitter shown in FIG. 1.

The input signal waveforms that are inputted to the transmitter 15 are shown in FIG. 3. Thus, the microcomputer 14 outputs the 24 bits digital color control data. The FPGA 12 provides the transmitter 15 with the data enable signal (DE) to indicate that the digital color data is the actual data displayed in a screen. The clock pulse (CLK) is provided to read the digital color control data at the transmitter 15. The transmitter 15 performs the signal treatment process for the timing control signal (e.g. the horizontal/vertical synchronization signal, the clock pulse, and the data enable signal) and the color control data transmitted from the FPGA 12. Finally, the microcomputer 14 matches the transmission standard, and transmits the compressed digital R/G/B image signal and the clock pulse to the monitor through a connector 16, as shown in FIG. 1.

The monitor then receives the digital R/G/B image signal transmitted by the transmitter 15 through the connector 16 in accordance with the clock pulse, and displays the digital R/G/B image signal on the screen through the signal treatment process. It is thus possible to test the digital monitor by determining whether the displayed image signal is in a normal or abnormal state.

Figure 4:
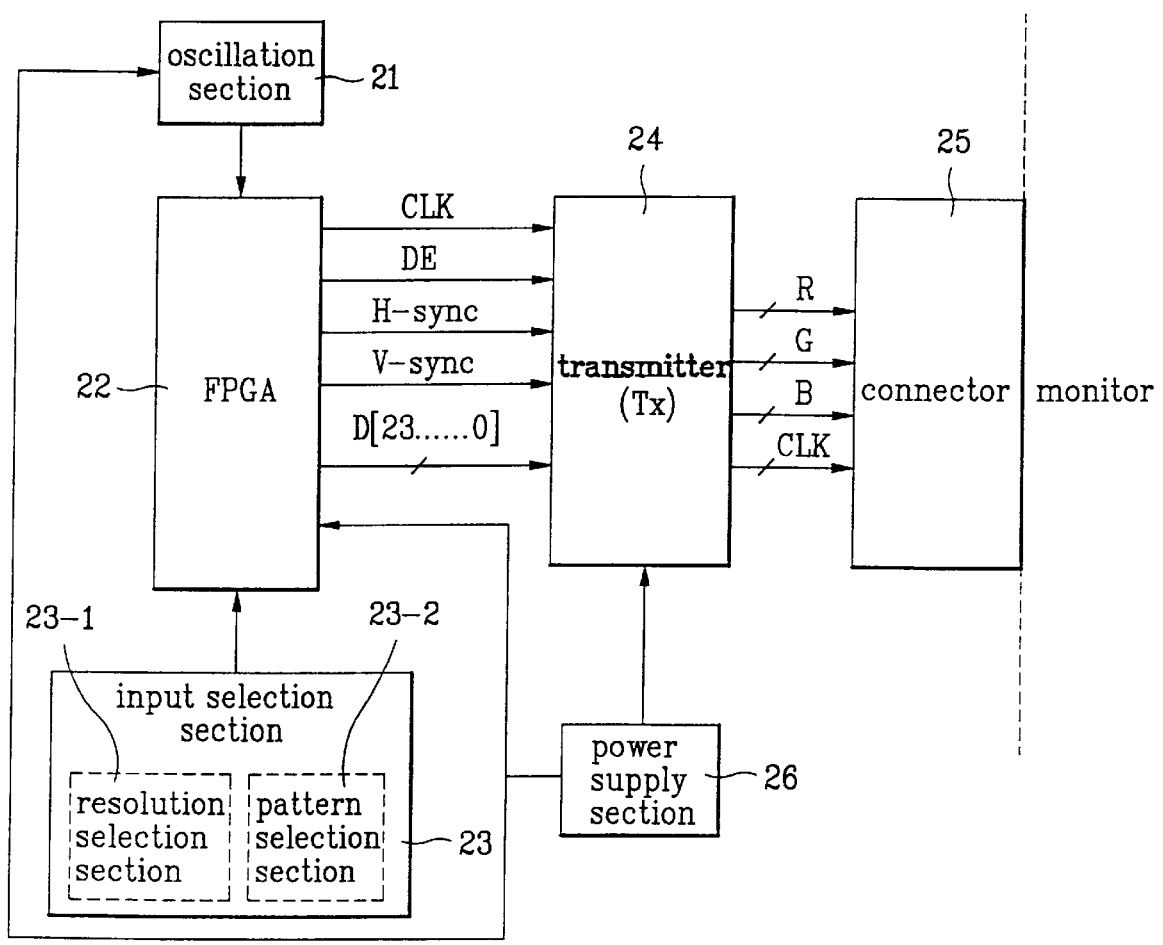
FIG. 4 is a block diagram of a digital monitor test device according to a second preferred embodiment of the present invention.

FIG. 4 is a block diagram of a digital monitor test device according to a second preferred embodiment of the present invention. Referring to FIG. 4, the device includes an input selection section 23 for selecting a resolution or a color pattern of an input image of a testing monitor, and a Field Programmable Gate Array (FPGA) 22 for outputting a timing control signal (for example, a vertical/horizontal synchronization signal, a data enable signal, and a clock pulse). The timing control signal is generated according to the resolution selected in the input selection section 23. The FPGA 22 also outputs a color control data signal for controlling the color pattern of the input image of the monitor according to the color pattern selected in the input selection section 23.

The device also includes an oscillation section 21 for generating a reference clock pulse, which is provided to the FPGA 22, and a transmitter 24 for transmitting digital R/G/B image signals and clock pulses to the monitor according to the timing control signal and the color control data outputted from the FPGA 22. Finally, a power supply section 26 is preferably included for providing operational power to the FPGA 22, the oscillation section 21, and the transmitter 24.

The operation of the second preferred embodiment of the digital monitor test device will next be described. First, the resolution or the color pattern for the test is selected through the input selection section 23. This can either be done manually or by an automatic test system. When the resolution or the color pattern for the test is selected through the input selection section 23, the FPGA 22 perceives a state selected by the input selection section 23 and outputs the timing control signal, for example, the horizontal/vertical synchronization signal, the data enable signal, and the clock pulse, to the transmitter 24 according to the corresponding resolution. Next, the FPGA 22 outputs the digital color control data, comprising 24 bits D23~D0. The digital color control data has 8 bits for each R/G/B image signal. The digital color control data is outputted in accordance with the input selection section 13 so that the selected color pattern is provided to the monitor. That is to say, the FPGA 22 generates the timing control signal, i.e. the horizontal/vertical synchronization signal, the data enable signal, and the clock pulse, corresponding to a specific resolution selected in the resolution selection section 23-1 of the input selection section 23 using the reference clock pulse provided from the oscillation section 23. It then outputs the timing control signal to the transmitter 24, and generates the digital color control data of the color pattern according to the selection of the pattern selection section 23-2.

Next, the transmitter 24 performs a signal treatment process for the color control data and the timing control signal transmitted from the FPGA 22 to match the transmission standard. The transmitter then transmits the compressed digital R/G/B image signal and the clock pulse to the monitor through a connector 25.

The monitor receives the digital R/G/B image signal transmitted by the transmitter 24 in accordance with the clock pulse, and displays the digital R/G/B image signal on the screen through the signal treatment process while the digital monitor can thus be tested by determining whether the displayed image signal is normal or abnormal. Thus, in the second preferred embodiment, the FPGA 22 serves a role that is performed by the microcomputer 14 in the first preferred embodiment so that the structure and the procedure of the treating signals is even more simplified.

The digital monitor test device, according to both the first and second preferred embodiments, has many advantages. For example, the device can improve work efficiency by simplifying and refining the test process without linking the digital video card to the monitor model by model. This can be achieved since the image signal format of each digital monitor becomes the standard module format.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A device for testing a digital monitor, comprising:
   a Field Programmable Gate Array (FPGA), which outputs a timing control signal;
   an oscillator to generate a reference clock pulse to provide to the FPGA;
   an input selection section to select at least one of a resolution and a color pattern of an input image of a monitor;
   a microcomputer to output a control signal according to the resolution selected in the input selection section, to control the FPGA and to output a color control data signal to control the input image of the monitor to correspond to the selected color pattern; and
   a transmitter to transmit digital R/G/B image signals and clock pulses to the monitor according to the timing control signal outputted from the FPGA and the color control data signal outputted from the microcomputer.

2. The device of claim 1, wherein the timing control signal comprises vertical and horizontal synchronization signals and a clock pulse.

3. The device of claim 1, wherein the input selection section comprises a Dip switch.

4. The device of claim 1, further comprising a connector to couple an output terminal of the transmitter and an input terminal of the monitor.

5. A device for testing a monitor, comprising:
   an input selection section, which selects at least one of a resolution and a color pattern of an input image of a monitor;
   a Field Programmable Gate Array(FPGA), which outputs a timing control signal according to the resolution selected in the input selection section, and outputs color control data to control the color pattern of the input image of the monitor according to the color pattern selected in the input selection section;
   an oscillator, which generates a reference clock pulse and provides the FPGA; and
   a transmitter, which transmits digital R/G/B image signals and clock pulses to the monitor according to the timing control signal and the color control data outputted from the FPGA.

6. The device of claim 5, wherein the timing control signal comprises vertical and horizontal synchronization signals and a clock pulse.

7. The device of claim 5, wherein the input selection section comprises a Dip switch.

8. The device of claim 5, further comprising means for coupling an output terminal of the transmitter to an input terminal of the monitor.

9. The device of claim 1, further comprising a power supply section to provide operational power to the FPGA, the oscillator, the microcomputer, and the transmitter, respectively.

10. The device of claim 5, further comprising a power supply section to provide operational power to the FPGA, the oscillation section, and the transmitter.

* * * * *